(12) United States Patent
Smith

(10) Patent No.: US 8,488,210 B2
(45) Date of Patent: Jul. 16, 2013

(54) IMAGING SCANNER WITH MULTIPLE IMAGE FIELDS

(75) Inventor: Larry J. Smith, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 947 days.

(21) Appl. No.: 11/765,345

(22) Filed: Jun. 19, 2007

(65) Prior Publication Data

US 2007/0297021 A1 Dec. 27, 2007

Related U.S. Application Data

(60) Provisional application No. 60/815,024, filed on Jun. 20, 2006.

(51) Int. Cl.
*H04N 1/04* (2006.01)
(52) U.S. Cl.
USPC ............ 358/474; 358/483; 358/501; 348/335
(58) Field of Classification Search
USPC ............ 358/474, 483, 482, 501, 494; 348/49, 348/335, E13.074, E05.24
See application file for complete search history.

(56) References Cited

U.S. PATENT DOCUMENTS

| | | | |
|---|---|---|---|
| 4,521,876 A * | 6/1985 | Ueno | 369/53.25 |
| 4,575,722 A * | 3/1986 | Anderson | 345/86 |
| 5,073,702 A | 12/1991 | Schuhmacher | |
| 5,621,424 A * | 4/1997 | Shimada et al. | 345/8 |
| 5,804,805 A | 9/1998 | Koenck et al. | |
| 5,814,803 A | 9/1998 | Olmstead et al. | |
| 5,900,997 A * | 5/1999 | Shapiro | 359/857 |
| 5,909,276 A | 6/1999 | Kinney et al. | |
| 6,000,619 A | 12/1999 | Reddersen et al. | |
| 6,053,408 A | 4/2000 | Stoner | |
| 6,142,376 A | 11/2000 | Cherry et al. | |
| 6,318,635 B1 | 11/2001 | Stoner | |
| 6,318,637 B1 | 11/2001 | Stoner | |
| 6,365,907 B1 | 4/2002 | Staub et al. | |
| 6,404,556 B1 * | 6/2002 | Kobayashi | 359/630 |
| 6,518,997 B1 | 2/2003 | Chow et al. | |
| 6,572,017 B1 | 6/2003 | Stoner | |

(Continued)

FOREIGN PATENT DOCUMENTS

| CA | 2 457 022 A1 | 10/2003 |
|---|---|---|
| CN | 1511298 A | 7/2004 |

(Continued)

OTHER PUBLICATIONS

European Search Report dated Feb. 15, 2010 for European Application No. 07798775.8.

(Continued)

*Primary Examiner* — Negussie Worku
(74) *Attorney, Agent, or Firm* — Stoel Rives LLP

(57) ABSTRACT

Disclosed are embodiments of methods, systems, and apparatus for providing multiple image fields or regions on an imaging array. In certain preferred embodiments, a high density imaging array may be partitioned into two or more regions, each of which may be used to render a separate view of the scan volume. This arrangement may provide an increase in the effective scan volume beyond the volume available with a single imager having a single point of view and may allow for reading of encoded symbols at a variety of orientations that would otherwise preclude accurate imaging with a single imager.

29 Claims, 3 Drawing Sheets

U.S. PATENT DOCUMENTS

| | | |
|---|---|---|
| 6,609,660 B1 | 8/2003 | Stoner |
| 6,678,097 B2 | 1/2004 | McKenney |
| 6,899,272 B2 | 5/2005 | Krichever et al. |
| 6,963,074 B2 | 11/2005 | McQueen |
| 7,014,113 B1 | 3/2006 | Powell et al. |
| 7,198,195 B2 | 4/2007 | Bobba et al. |
| 7,204,420 B2 | 4/2007 | Barkan et al. |
| 7,296,744 B2 | 11/2007 | He et al. |
| 7,317,813 B2* | 1/2008 | Yanagawa et al. ............ 382/104 |
| 7,533,819 B2 | 5/2009 | Barkan et al. |
| 7,757,955 B2 | 7/2010 | Barkan et al. |
| 7,780,086 B2 | 8/2010 | Barkan et al. |
| 8,248,592 B2* | 8/2012 | Taniguchi et al. ......... 356/237.1 |
| 8,261,990 B2 | 9/2012 | Olmstead |
| 2001/0009508 A1 | 7/2001 | Umemoto et al. |
| 2001/0032884 A1* | 10/2001 | Ring et al. .................... 235/454 |
| 2004/0031851 A1 | 2/2004 | Bianculli et al. |
| 2004/0223202 A1 | 11/2004 | Lippert et al. |
| 2006/0022051 A1 | 2/2006 | Patel et al. |
| 2006/0032919 A1 | 2/2006 | Shearin |
| 2006/0163355 A1 | 7/2006 | Olmstead et al. |
| 2009/0020612 A1 | 1/2009 | Drzymala et al. |

FOREIGN PATENT DOCUMENTS

| | | |
|---|---|---|
| EP | 1223535 | 7/2002 |
| JP | 4251992 A | 9/1992 |
| JP | 2005521164 | 7/2005 |
| KR | 10-2001/0005875 A | 1/2001 |
| WO | WO 98/44330 | 10/1998 |
| WO | WO 03/081521 A1 | 10/2003 |
| WO | WO 2006/062818 | 6/2006 |

OTHER PUBLICATIONS

Srinivasan, "A New Class of Mirrors for Wide-Angle Imaging," Centre for Visual Sciences, Research School of Biological Sciences, Australian National University, (date unknown, but circa 2000).

Srinivasan, "A New Class of Mirrors for Wide-Angle Imaging," Centre for Visual Sciences, Research School of Biological Sciences, Australian National University, (date unknown, but circa 2003).

* cited by examiner

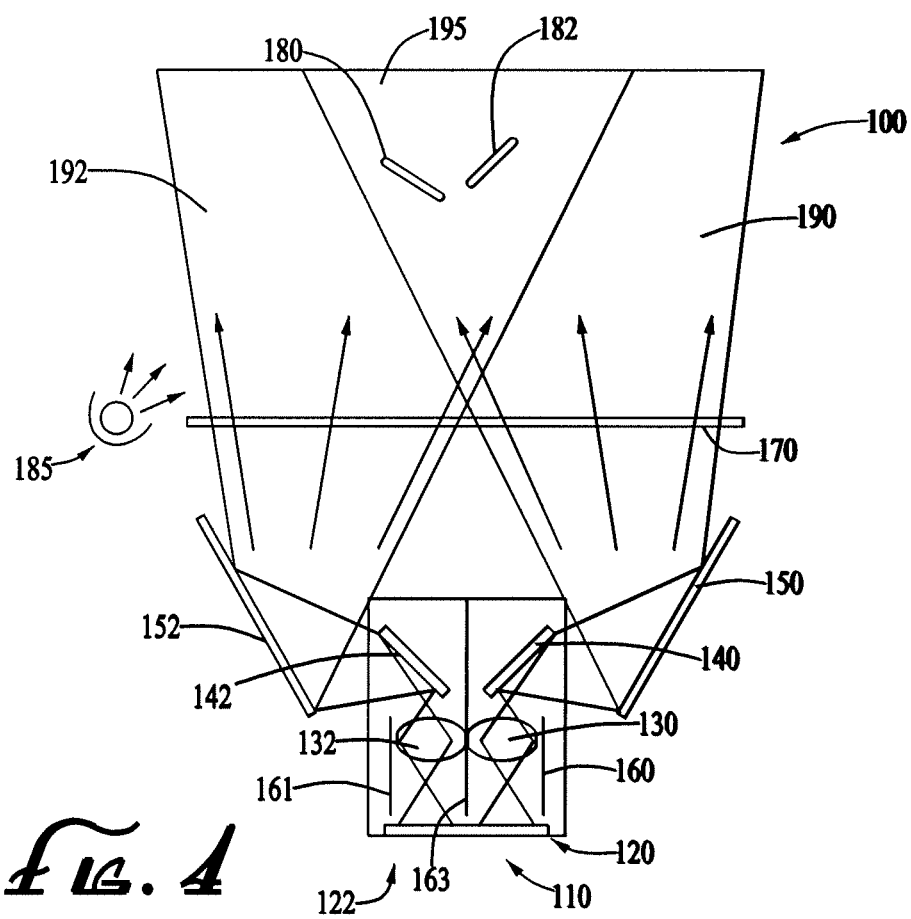

IMAGING SCANNER WITH MULTIPLE IMAGE FIELDS

RELATED APPLICATION DATA

This application claims the benefit under 35 U.S.C. §119(e) of U.S. Provisional Patent Application No. 60/815,024, filed Jun. 20, 2006, and titled "Image Scanner Using Mirror Basket," hereby incorporated by reference.

BACKGROUND

The field of the present invention relates generally to scanners. More particularly, it relates to systems, methods, and apparatus for improving the scanning performance of imaging scanners.

Imaging technology provides a number of benefits relative to more conventional laser scanning. For example, imagers are able to capture information at a much higher data rate than laser scanners. This provides for an earlier first opportunity for a label read, a denser effective scan pattern, and more scanning opportunities over a given time span. These advantages typically speed up the overall operation of the scanner in comparison with laser scanners. Imaging also may provide lower costs and higher reliability than laser scanning, which is a distinction that is likely to become more significant over time as imager costs continue to decline.

However, there are a number of drawbacks to imaging scanners. Many current laser-based fixed scanners utilize facet wheels and mirror baskets to create a scan pattern that gives scan coverage over a large spatial volume. This large scan volume allows a barcode to be read on any of several different scan lines having different viewing angles. Imaging scanners, by contrast, are typically based on a single lens and single imager array. Such scanners therefore provide only a single point of view, which may limit the ability of the scanner to recognize a barcode in certain circumstances.

For example, because the scan volume of an imaging scanner is conical in shape, attempting to read a barcode or other image in close proximity to the scanning window (reading "on the window") may be less effective than with a basket-type laser scanner. Also, when labels are oriented such that the illumination source is reflected directly into the imager, the imager may fail to read properly due to uniform reflection washing out the desired image entirely, or reflection from a textured specular surface washing out one or more elements. This effect may cause reading of shiny labels to be problematic at particular reflective angles. In addition, labels oriented at extreme acute angles relative to the imager may not be readable.

The present inventor has therefore determined that it would be desirable to provide an imaging scanner that improves on these or other such limitations.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings in which:

FIG. 2 is a schematic representation of an imaging array having a single imaging region.

FIG. 3 is a schematic representation of an imaging array broken up into four separate imaging regions in accordance with one embodiment.

FIG. 4 is a cutaway view of an imaging scanner with multiple imaging regions in accordance with one embodiment taken along line 4-4 of the schematic representation of FIG. 3.

DETAILED DESCRIPTION OF PREFERRED EMBODIMENTS

In the following description, numerous specific details are provided for a thorough understanding of specific preferred embodiments. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in one or more embodiments.

Disclosed herein are embodiments of methods, systems, and apparatus for improving the performance of imaging scanners by providing multiple image fields. In certain preferred embodiments, a high density imaging array may be partitioned into two or more regions, each of which may be used to render a separate view of the scan volume. This arrangement may provide an increase in the effective scan volume beyond the volume available with a single imager having a single point of view. In addition, this arrangement may provide for a recovery of certain performance indicia lost in the transition from laser scanning to imaging by providing multiple perspective views, such as have been available in laser scanning for some time. This arrangement may also provide a way to utilize the extra pixels that may be increasingly available with higher density imaging arrays in the future.

Figure 1:
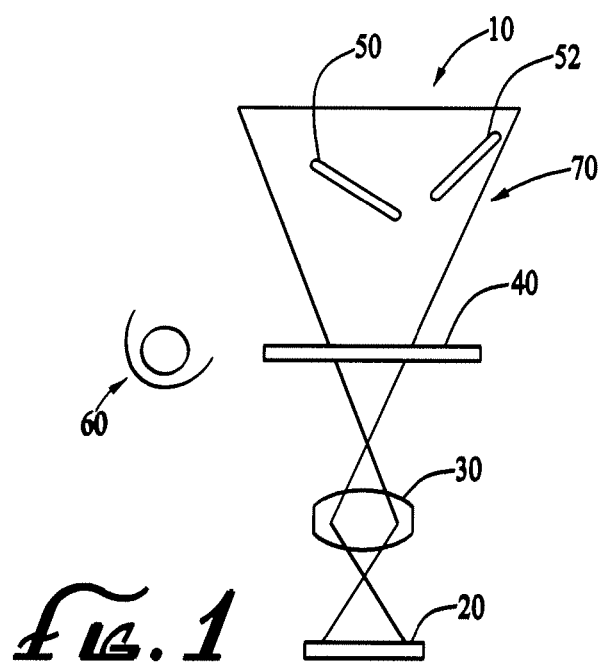
FIG. 1 depicts an imaging scanner with a single imaging region.

Some of the problems that may be associated with single-imager scanners are illustrated in FIG. 1. FIG. 1 depicts a single-imager scanner 10 including an imager 20, a lens 30, and a scanner window 40. Two labels, label 50 and label 52, are positioned in front of the scanner window 40 and the scanner 10 is attempting to read the labels. Light from the illumination source, shown at 60, reflects from labels 50 and 52 and enters imager 20. The scan volume of scanner 10 is shown at 70. Scan volume 70 is conical, as shown in FIG. 1. Label 50 is positioned at an angle relative to illumination source 60 such that specular reflection becomes an issue and may cause scanner 10 to fail to properly read label 50. Label 52 may also be unreadable by scanner 10, due to the steep angle of incidence between the surface of label 52 and the imager.

These and other problems may be solved by splitting an imaging array, such as the imaging array Q shown in FIG. 2, into multiple imaging regions, and preferably by using a different optical path for each such region. For example, array Q may be split up into four separate imaging regions, Q1-Q4, as shown schematically in FIG. 3. Each of regions Q1-Q4 may have a separate and distinct field of vision and/or scan volume.

Figure 5:
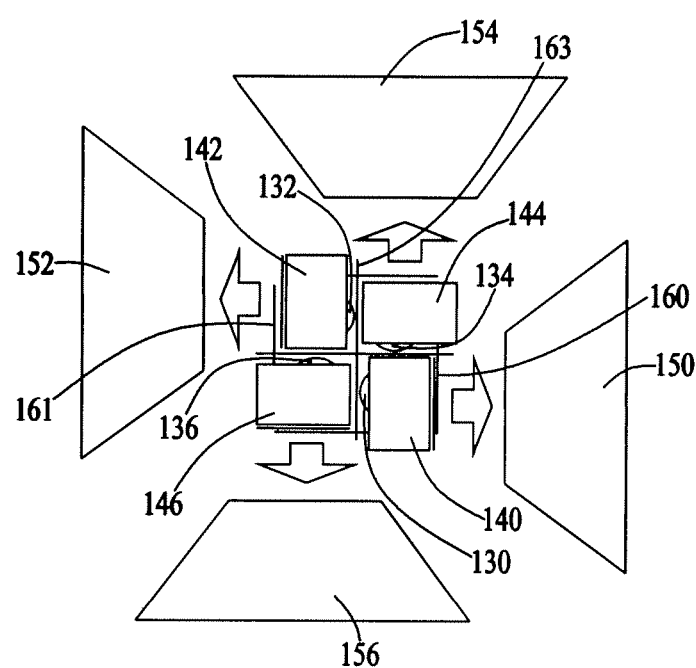
FIG. 5 is a top view of the imaging scanner shown in FIG. 4.

FIGS. 4 and 5 depict an embodiment of a multiple-imager scanner 100. Scanner 100 includes a high-density imaging array 110, which is split up into four separate imaging regions (note that only two of the four imaging regions can be seen in the side view of FIG. 4). With reference first to FIG. 4, a first imaging region 120 is supported by lens 130, folding mirror 140, and basket mirror 150. A second imaging region 122 likewise is supported by lens 132, folding mirror 142, and basket mirror 152. As used herein, the term "basket mirror" refers to the first mirror encountered by an image coming into the scanner. In some embodiments, these mirrors are mounted on a molded plastic "basket," which is why the term is used. It should be understood, however, that mirrors may be considered within the scope of the term "basket mirror" even if they are not mounted on a basket, plastic molded or otherwise. As used herein, the term "folding mirror" refers to the second mirror in the assembly, which lines the image up to the lens/imager axis. It should be noted, however, that, in the depicted embodiment, the basket mirrors are arranged around a central axis and are configured to reflect light radially inward to the folding mirrors.

It should be understood that the various elements disclosed herein are examples and may be replaced by other suitable elements in alternative embodiments. For example, although lenses are provided in the embodiments depicted in the accompanying figures, any other focusing element, such as a parabolic focusing mirror, may be used instead.

In some embodiments, the various imaging regions of an imaging array may be physically partitioned from one another. For example, light baffles 160, 161, and 163 may be provided to separate the individual imaging regions of the device. These light baffles may be positioned in between some of the components supporting the individual imaging regions, such as in between the lenses and folding mirrors of each imaging region, as best shown in FIG. 5. In some embodiments, the light baffles may be integrally molded as part of an assembly. In other embodiments, the light baffles may be attached to an assembly to separate the imaging array into sections. As can be seen from the aforementioned figure, light from illumination source 185 reflects from labels 180 and 182, passes through scanner window 170, is reflected from the basket mirrors 150 and 152 onto the folding mirrors 140 and 142, through the lenses 130 and 132, and into the various imaging regions Q1-Q4 of high density imaging array 110.

Two-dimensional representations of two of the four scan volumes generated by the respective imaging regions can be seen in FIG. 4. Scan volume 190 maps to imaging region 120 (Q4 in FIG. 3) and scan volume 192 maps to imaging region 122 (Q2 in FIG. 3). It can be seen that scan volumes 190 and 192 overlap at region 195 to form a combined effective scan volume. Scan volumes 190 and 192 are, however, directed along different angles. Therefore, not only can labels within the effective scan volume of both scan volumes 190 and 192 (but outside of the overlapping scan volume 195) be read, but labels within the overlapping scan volume 195 may be readable that might have been unreadable without multiple scan regions.

For example, label 180 is positioned at an angle with respect to illumination source 185 such that, without multiple imaging regions, it may be unreadable due to specular reflection problems, as discussed above with reference to FIG. 1. However, with multiple imaging regions directed at distinct angles to one another, label 180 may be readable by one imaging region, such as region 120, even if it is unreadable by other imaging regions, such as region 122. Alternatively, even if the label is not readable by any one imaging region, a merging of the various images may be performed, as described in greater detail below, in order to properly read the image. In addition, whereas label 182 may have been unreadable if only imaging region 122 (and scan volume 192) were present (due to the steep angle of incidence between label 182 and scan volume 192) the presence of imaging region 120 (and scan volume 190) provides an alternative scan angle and thereby allows label 182 to be read.

FIG. 5 depicts a top view of the multiple-imager scanner 100. It should be noted that two additional imaging regions can be seen in FIG. 5 (which are not depicted in the cross-sectional view of FIG. 4). In particular, it can be seen in FIG. 5 that, in addition to the aforementioned lenses, folding mirrors, basket mirrors, and light baffles shown in FIG. 4, the other two imaging regions shown in the top view of FIG. 5 also have associated therewith lenses, folding mirrors, basket mirrors, and light baffles. Thus, the additional imaging regions shown in FIG. 5 have accompanying lenses 134 and 136, folding mirrors 144 and 146, and basket mirrors 154 and 156. The arrows shown in FIG. 5 illustrate which basket mirror each of the respective folding mirrors and imaging regions is associated with.

As seen in FIG. 5, the basket mirrors 150, 152, 154, and 156 form a "basket" configuration around the imager. Each of the basket mirrors in the depicted embodiment comprises a trapezoidal-shaped mirror having a taper from the top portion (closest to the scanning window) to the bottom portion (closest to the imaging array). This shape may be advantageous in some embodiments for purposes of manufacturing simplification and/or design compactness. It should be appreciated, however, that a number of alternatives are possible. For example, in other embodiments, other polygonal mirrors may be used. In still other embodiments, non-polygonal mirrors may be acceptable. The basket mirrors 150, 152, 154, and 156 are positioned and configured to project an image onto the folding mirrors 140, 142, 144, and 146, which, in turn, projects the image onto one of the imaging regions.

In the depicted embodiment, the imaging array is partitioned into rectangular imaging regions. Of course, other embodiments are contemplated in which the imaging regions are not rectangular. In addition, as seen with reference to FIG. 5, each of the folding mirrors 140, 142, 144, and 146 are rectangular, and each is oriented at a ninety-degree angle with respect to its adjacent mirrors. Again, this need not be true for all embodiments.

Each imaging region of the array may be therefore be located at the image plane of a separate lens and separate set of mirrors. The combination of basket mirrors, folding mirrors, and light baffles for each of the respective imaging regions acts as a periscope assembly, which allows each of the individual imaging regions to "view" or be directed at an angle distinct from the other imaging region (in an embodiment having two), or any of the other imaging regions (in embodiments having more than two).

In some embodiments, folding mirrors may be provided for creating a periscope assembly, as mentioned above. As described earlier, the terms the "basket mirror" and "folding mirror" are used herein to refer to the mirrors' respective positions in the assembly, rather than as requiring any specific structure or type of mirror. In addition, a molded assembly containing light baffles positioned in between the lenses and one or more of the mirrors of each individual imaging region, for example, may be provided to separate the imaging array into separate imaging regions and to house components of the device. A lens positioned adjacent to each of the folding mirrors may also be included in the molded assembly if desired to focus the light received from the periscope assembly onto the imaging array. Basket mirrors may be provided to direct light to the folding mirrors, which, in turn, direct the light through the lenses. It is contemplated that basket mirrors similar to those used in existing or conventional laser scanners may be used in connection with certain embodiments.

A configuration with basket mirrors, folding mirrors, and lenses may be used to provide a "periscope" specific to each of the imager regions. The folding mirror and basket mirror (the "periscope") may, for each imaging region, be aimed along a different angle to allow the scanner to read from more than one point of view in the overall effective scanner volume. This multiple point of view configuration may allow the scanner to increase the effective scan volume by spacing out and strategically placing the conical regions defined and viewed by each "periscope." By carefully choosing the placement of the imaging array regions, the effective scan volume may also be made less conical and, if desired, more like the rectangular scan region of many conventional laser scanners. Any periscope assembly configured to transform a viewing axis to a desired imaging axis should be considered a suitable "periscope assembly."

One exemplary method of reading data from encoded symbols by imaging may comprise the steps of: (a) exposing a first encoded symbol to an imaging window at a first orientation with respect to the imaging window; (b) exposing a second encoded symbol to the imaging window at a second orientation with respect to the imaging window; (c) imaging the first encoded symbol on an imaging array, wherein the imaging array comprises a 2D array of pixels with a first imaging region for acquiring a first two-dimensional image and a second imaging region for acquiring a second two-dimensional image, and wherein the first imaging region has a first field of vision that is distinct from a second field of vision of the second imaging region; and (d) imaging the second encoded symbol on the imaging array.

According to the above example, the first encoded symbol may be imaged on the first imaging region and the second encoded symbol may be imaged on the second imaging region.

The above example method may further comprise reading the first encoded symbol solely from the image on the first imaging region and reading the second encoded symbol solely from the image on the second imaging region.

In addition to increasing the scan volume and shape of the effective scan region, one preferred embodiment may also be used to reduce or eliminate specular reflection problems that are commonly associated with conventional imaging scanners. For example, since the viewing angles of the various imaging array regions will typically be distinct, labels which have specular reflections in one imaging region may be readable without such reflections in one or more of the other imaging regions.

Moreover, if two or more of the views received by different imaging regions are washed out due to specularity, two or more such images may be merged by utilizing, for example, algorithms available to one having ordinary skill in the art. For example, algorithms similar to those used for motion compensation in a single-imager scanner may be used to merge two or more of the aforementioned images. It is anticipated that having knowledge of the fixed relation between the imaging regions should simplify the steps involved in correlating the images. Further details on exemplary algorithms that may be used in conjunction with various embodiments can be found in U.S. Patent Application Publication No. 2006/0249581 titled "Methods and Systems for Forming Images of Moving Optical Codes," which is hereby incorporated by reference in its entirety. Additional information regarding solutions for dealing with specular reflection problems can be found in U.S. Patent Application Publication No. 2006/0163355 titled "Data reader and methods for imaging targets subject to specular reflection," which is hereby incorporated by reference in its entirety. Certain embodiments may also provide a use for the extra pixels available with higher density imaging arrays, particularly where the higher density or extra pixels are not needed to improve label element rendering.

In addition, labels which may be oriented at extreme acute angles in one image are likely to be oriented at a greater (less acute) angle in one or more other images from other imaging array regions. Such images, which would have been unrecognizable in a conventional single-imager scanner, may be recognized by one or more of the multiple imaging region scanners disclosed herein.

The inventive principles set forth herein may also be combined with other related technology in some embodiments. For example, it is contemplated that some embodiments may provide imaging regions which are focused to different scanning distances. Further information and detail regarding such technology can be found in U.S. Pat. No. 6,318,635 titled "Multi-Focal Length Imaging Based Portable Dataform Reader," which is hereby incorporated by reference in its entirety. In addition, one or more embodiments of the invention may be used in conjunction with technology set forth in U.S. Pat. No. 5,814,803 titled "Image Reader With Multi-Focus Lens," which is also hereby incorporated by reference. More particularly, a kaleidoscope structure, such as is shown and described with reference to FIGS. 62A-62F in the aforementioned patent, may be provided for projecting multiple rotated images of an encoded symbol onto an imaging array.

The terms and descriptions used herein are set forth by way of illustration only and are not meant as limitations. Those skilled in the art will recognize that numerous variations and modifications can be made to the details of the above-described embodiments without departing from the underlying principles of the invention. The scope of the invention should therefore be determined only by the claims, and their equivalents.

The invention claimed is:

1. An imaging scanner comprising:
    an imaging array comprised of a 2D array of pixels, the imaging array comprising a first imaging region for acquiring a first two-dimensional image and a second imaging region for acquiring a second two-dimensional image, wherein the first imaging region has a first field of vision that is distinct from a second field of vision of the second imaging region;
    a first plurality of mirrors for directing light in the first field of vision onto the first imaging region of the imaging array; and
    a second plurality of mirrors for directing light in the second field of vision onto the second imaging region of the imaging array.

2. The imaging scanner of claim 1, further comprising:
    a first focusing element positioned to focus light onto the first imaging region; and
    a second focusing element positioned to focus light onto the second imaging region.

3. The imaging scanner of claim 2, wherein the first and second focusing elements comprise lenses.

4. The imaging scanner of claim 1, wherein the field of vision of the first imaging region is oriented at a distinct angle relative to the field of vision of the second imaging region.

5. The imaging scanner of claim 1, wherein the imaging array further comprises a third imaging region and a fourth imaging region.

6. The imaging scanner of claim 5, wherein each of the imaging regions of the imaging array has a field of vision that is distinct from the fields of vision of the other imaging regions.

7. The imaging scanner of claim 1, wherein the first imaging region is physically partitioned from the second imaging region.

8. The imaging scanner of claim 7, further comprising a light baffle positioned to partition the first imaging region from the second imaging region.

9. The imaging scanner of claim 1, wherein the first imaging region maps to a first scan volume, wherein the second imaging region maps to a second scan volume, and wherein a portion of the first scan volume overlaps with a portion of the second scan volume to form an overlapping scan volume.

10. The imaging scanner of claim 1, wherein the first plurality of mirrors comprises a folding mirror and a basket mirror, and wherein the second plurality of mirrors comprises a folding mirror and a basket mirror.

11. The imaging scanner of claim 10, further comprising:
a first lens positioned to focus light onto the first imaging region; and
a second lens positioned to focus light onto the second imaging region.

12. The imaging scanner of claim 11, wherein the basket mirror of the first plurality of mirrors is configured to reflect light passing through a window of the scanner to the folding mirror of the first plurality of mirrors, and wherein the folding mirror of the first plurality of mirrors is configured to reflect light from the basket mirror of the first plurality of mirrors through the first lens and onto the first imaging region.

13. An imaging scanner comprising:
an imaging array comprised of a 2D array of pixels, the imaging array comprising a first imaging region for acquiring a first two-dimensional image and a second imaging region for acquiring a second two-dimensional image, wherein the first imaging region has a first field of vision that is oriented at a distinct angle relative to a second field of vision of the second imaging region;
a first periscope assembly for directing and focusing light onto the first imaging region of the imaging array, the first periscope assembly comprising a first basket mirror, a first folding mirror, and a first focusing element; and
a second periscope assembly for directing and focusing light onto the second imaging region of the imaging array, the second periscope assembly comprising a second basket mirror, a second folding mirror, and a second focusing element.

14. The imaging scanner of claim 13, further comprising:
a third periscope assembly for directing and focusing light onto a third imaging region of the imaging array, the third periscope assembly comprising a third basket mirror, a third folding mirror, and a third focusing element; and
a fourth periscope assembly for directing and focusing light onto a fourth imaging region of the imaging array, the fourth periscope assembly comprising a fourth basket mirror, a fourth folding mirror, and a fourth focusing element.

15. The imaging scanner of claim 13, wherein the focusing elements of the first and second periscope assemblies comprise lenses.

16. The imaging scanner of claim 13, wherein the first imaging region is physically partitioned from the second imaging region.

17. The imaging scanner of claim 16, further comprising a light baffle positioned to partition the first imaging region from the second imaging region.

18. The imaging scanner of claim 17, wherein the light baffle is also positioned to partition at least a portion of the first periscope assembly from at least a portion of the second periscope assembly.

19. The imaging scanner of claim 13, wherein the first imaging region maps to a first scan volume, wherein the second imaging region maps to a second scan volume, and wherein a portion of the first scan volume overlaps with a portion of the second scan volume to form an overlapping scan volume.

20. The imaging scanner of claim 13, wherein the first periscope assembly is configured to reflect light passing through a window of the scanner from the basket mirror to the folding mirror and from the folding mirror, through the first focusing element, and onto the first imaging region.

21. A method for reading data from encoded symbols by imaging, the method comprising the steps of:
exposing a first encoded symbol to an imaging window at a first orientation with respect to the imaging window;
exposing a second encoded symbol to the imaging window at a second orientation with respect to the imaging window;
imaging the first encoded symbol on an imaging array, wherein the imaging array comprises a 2D array of pixels with a first imaging region for acquiring a first two-dimensional image via a first plurality of mirrors and a second imaging region for acquiring a second two-dimensional image via a second plurality of mirrors, and wherein the first imaging region has a first field of vision that is distinct from a second field of vision of the second imaging region; and
imaging the second encoded symbol on the imaging array.

22. The method of claim 21, wherein the first encoded symbol is imaged on the first imaging region and the second encoded symbol is imaged on the second imaging region.

23. The method of claim 22, further comprising reading the first encoded symbol solely from the image on the first imaging region and reading the second encoded symbol solely from the image on the second imaging region.

24. The method of claim 22, wherein first orientation of the first encoded symbol prevents the second imaging region alone from reading the first encoded symbol.

25. The method of claim 21, wherein the first encoded symbol is imaged on the first imaging region and the second imaging region.

26. The method of claim 25, further comprising reading the first encoded symbol by merging an image of the first encoded symbol from the first imaging region with an image of the first encoded symbol from the second imaging region.

27. The method of claim 21, wherein the imaging array further comprises a third imaging region and a fourth imaging region.

28. The method of claim 27, wherein each of the imaging regions of the imaging array has a field of vision that is distinct from the fields of vision of the other imaging regions.

29. The method of claim 21, wherein the field of vision of the first imaging region is oriented at a distinct angle relative to the field of vision of the second imaging region.

* * * * *